US012700892B2

(12) United States Patent
Winick et al.

(10) Patent No.: US 12,700,892 B2
(45) Date of Patent: Aug. 4, 2026

(54) SYSTEMS AND METHODS FOR CANCELLATION OF CROSSTALK

(71) Applicant: Keysight Technologies Canada Inc., Loveland, CO (US)

(72) Inventors: Adam B. Winick, Toronto (CA); Joel J. Wallman, Kitchener (CA)

(73) Assignee: KEYSIGHT TECHNOLOGIES CANADA INC., Mississauga (CA)

( * ) Notice: Subject to any disclaimer, the term of this patent is extended or adjusted under 35 U.S.C. 154(b) by 1099 days.

(21) Appl. No.: 17/032,508

(22) Filed: Sep. 25, 2020

(65) Prior Publication Data

US 2021/0099201 A1 Apr. 1, 2021

Related U.S. Application Data

(60) Provisional application No. 63/039,927, filed on Jun. 16, 2020, provisional application No. 62/906,658, filed on Sep. 26, 2019.

(51) Int. Cl.
| | |
|---|---|
| *G06N 10/20* | (2022.01) |
| *G06N 10/70* | (2022.01) |
| *H04B 3/32* | (2006.01) |

(52) U.S. Cl.
CPC .............. *H04B 3/32* (2013.01); *G06N 10/20* (2022.01); *G06N 10/70* (2022.01)

(58) Field of Classification Search
CPC .................................. G06N 10/00; H04B 3/32
See application file for complete search history.

(56) References Cited

U.S. PATENT DOCUMENTS

| | | | |
|---|---|---|---|
| 10,891,555 B2 * | 1/2021 | Ashrafi | H04L 9/0858 |
| 12,056,577 B1 * | 8/2024 | Rubin | G06N 10/80 |
| 2010/0251049 A1 * | 9/2010 | Goto | H03M 13/19 |
| | | | 714/E11.032 |
| 2019/0156239 A1 | 5/2019 | Martinis et al. | |

OTHER PUBLICATIONS

Moll et al., Quantum Optimization Using Variational Algorithms on Near-Term Quantum Devices, Published Jun. 19, 2018, Quantum Sci. Technol. 3, 17 pp. (Year: 2018).*
Steane, 'A Tutorial on Quantum Error Correction' 2006, IOS Publication, pp. 1-32 (Year: 2006).*
1 Written Opinion and International Search Report, dated Nov. 25, 2020, 8 pgs.

* cited by examiner

*Primary Examiner* — Elias Desta

(57) ABSTRACT

Systems and methods for estimating crosstalk in a quantum system are provided. The quantum system comprises a plurality of qudits. A plurality of interacting systems within the plurality of qudits during a quantum operation are identified. Each such interacting system comprises a subset of the plurality of qudits. A set of components is identified from the plurality of interacting systems. Each given component in the set of components is evolved along with the respective components in the set of components that interact with the given component in the quantum operation, thereby forming a plurality of maps for the set of components. For each respective component in the set of components, a corresponding marginal distribution is calculated using the corresponding map for the respective component, thereby computing a plurality of marginal distributions. An estimate of the Pauli error distribution is constructed for the quantum operation from the plurality of marginal distributions.

19 Claims, 6 Drawing Sheets

SYSTEMS AND METHODS FOR CANCELLATION OF CROSSTALK

CROSS REFERENCE TO RELATED APPLICATION

This Application claims priority to U.S. Provisional Patent Application No.: 62/906,658, entitled "Systems and Methods for Cancellation of Crosstalk," filed Sep. 26, 2019, which is hereby incorporated by reference in its entirety.

STATEMENT REGARDING FEDERALLY SPONSORED RESEARCH OR DEVELOPMENT

This invention was made with government support under W911NF-14-1-0103 awarded by the U.S. Army Research Office. The government has certain rights in the invention.

TECHNICAL FIELD

The present disclosures relate generally to scalable systems and methods for optimizing a set of gates of a quantum device.

BACKGROUND

Achieving the advantages of quantum computing and realizing practical quantum information processing is a challenge due to an innate sensitivity to errors and noise. An aspect of this challenge is the dichotomy apparent in the implementation of high-fidelity simultaneous one-qubit and high-fidelity two-qubit gates. Fast two-qubit gates require spatially or spectrally nearby qubits, which inherently reduces the addressability of the constituent subsystems. See, Gershenfeld et al., 1997, "Bulk Spin-Resonance Quantum Computation," Science Mag., 275, pg. 350; Piori et al., 2008, "Electrically driven single-electron spin resonance in a slanting Zeeman field," Nature Physics, 4, pg. 776; each of which is hereby incorporated by reference in its entirety. A resonant pulse intended for one qubit can induce rotations on the others. Proposed architectures have typically dealt with this crosstalk by maximizing the gap between qubits or by executing local operations asynchronously. See, Vandersypen et al., 2005, "NMR techniques for quantum control and computation," Review of Modern Physics, 76, pg. 1037; Schutjens et al., 2013, "Single-qubit gates in frequency-crowded transmon systems," Physical Review A, 88, pg. 052330; Piltz et al., 2014, "A trapped-ion-based quantum byte with 10-5 next-neighbour cross-talk," Nature Communications, 5, pg. 4679; Boixio et al., 2018, "Characterizing Quantum Supremacy in Near-term devices," Nature Physics, 14(6), pg. 595, each of which is hereby incorporated by reference in its entirety. The former solution requires the ability to tune couplings or extra engineering, but the added complexity can adversely impact coherence times and requires additional control wires. In the latter approach, depending on the extent to which the control fields affect neighboring subsystems, the time overhead can be significant, and parallel operations should be employed.

In theory, only a small number of distinct gates are needed to perform fault-tolerant quantum computation. In practice, single-qubit operations have considerably higher fidelities than their multi-qubit counterpart. Thus, it is desirable to be able to apply any element of $SU(2)^{\otimes N}$, thereby minimizing a number of two-qubit gates. Moreover, a high-fidelity implementation of the group is naturally suited for randomized compiling, which tailors coherent and spatially correlated errors on two-qubit gates into stochastic Pauli noise. See, Wallman et al., 2016, "Noise tailoring for scalable quantum computation via randomized compiling," Physical Review A, 94, pg. 1-10, which is hereby incorporated by reference in its entirety. In near-term applications, the much higher fault-tolerance thresholds and noise reduction afforded by the method will be valuable for fault-tolerant quantum information processing.

Furthermore, Crosstalk describes a broad range of effects that violate one of two assumptions: spatial locality and independence of operations. See Rudiger et al., 2019, "Probing Context-Dependent Errors in Quantum Processors," Phys. Rev., X(9), pg. 021045; Sarovar et al., 2019, "Detecting Crosstalk Errors in Quantum Information Processors," arXiv preprint, arXiv:1908.09855, print; Abrams et al., 2019, "Methods for Measuring Magnetic Flux Crosstalk between Tunable Transmons," Phys. Rev., 12(6), pg. 064022, each of which is hereby incorporated by reference in their entirety. Gates and other operations are supposed to act on disjoint subsets of qubits. However, unintended interactions can couple the qubits, producing nonlocal correlated noise. Even if an operation has a well-defined action on a particular subset of qubits, the effective noise might depend on its context—what operations affect other qubits.

Prior work has often approached the problem of implementing several operations on a collection of qubits by breaking the problem into a temporally-disjoint sequence of gates. See, Gershenfeld et al.; Vandersypen et al.; Piltz et al. In contrast, other methods analyzed the problem by simultaneously driving two spins with a homogeneous field in the setting of NMR. See, Steffen et al., 2000, "Simultaneous Soft Pulses Applied at Nearby Frequencies," Journal of Magnetic Resonance, 146, pg. 369, which is hereby incorporated by reference in its entirety. However, application of theses methods to many-qubit or multilevel systems, such as transmons or trapped ions, is not clear. Additional methods have studied how to drive two transmons coupled to the same cavity suffering from spectral crowding with simultaneous X- or Y-gates with rotation angles and $\pi$ and $\pi/2$. See, Theis et al., 2016, "Simultaneous gates in frequency-crowded multilevel systems using fast, robust, analytic control shapes," Physical Review A, 93, pg. 012324, which is hereby incorporated by reference in its entirety. In either case, these methods do not directly apply to many-qubit systems, nor do they handle non-local correlations. Nevertheless, without modification, these algorithms would lie in EXPSPACE.

The information disclosed in this background section is only for enhancement of understanding of the general background of the invention and should not be taken as an acknowledgement or any form of suggestion that this information forms the prior art already known to a person skilled in the art.

SUMMARY

The present disclosure provides systems and methods for optimizing a set of gates on a quantum device.

One aspect of the present disclosure provides a digital computer system for estimating one or more error processes, including crosstalk, occurring in a quantum computer system. The quantum computer system comprises a plurality of qudits, and each qudit in the plurality of qudits has a dimension of N, where N is a positive integer of 2 or greater. The digital computer system comprises one or more digital processors, a memory, and one or more programs. The one or more programs are stored in the memory and are configured to be executed by the one or more digital processors. The one or more programs include, for each respective quantum operation in a set of at least one quantum operation, instructions for (i) identifying a plurality of interacting systems within the plurality of qudits during the respective quantum operation, wherein each respective interacting system in the plurality of interacting systems comprises a corresponding subset of the plurality of qudits, (ii) identifying a corresponding set of components from the plurality of interacting systems, (iii) for each respective component in the corresponding set of components, evolving the respective component along with the respective components in the corresponding set of components that interact with the respective component in the respective quantum operation, thereby forming a plurality of maps for the respective set of components, (iv) calculating, for each respective component in the corresponding set of components, a corresponding marginal distribution using the corresponding map for the respective component, thereby computing a plurality of marginal distributions for the corresponding set of components and (v) constructing a respective estimate of all or a portion of an entire Pauli error distribution for the respective quantum operation from the plurality of marginal distributions for the corresponding set of components.

In some embodiments, the respective quantum operation is a single-qubit gate or an entangling gate. For example, in some embodiments, the entangling gate is a cross-resonance gate or an iSWAP gate.

In some embodiments, the set of at least one quantum operation is a plurality of gates implemented in a temporal order on the quantum computer system.

In some embodiments, each component in the corresponding set of components is a set of qudits, in the plurality of qudits, that are coupled together in the respective quantum operation.

In some embodiments, the quantum system further comprises a plurality of drive fields, where each respective drive field in the plurality of drive fields is applied to a corresponding qudit in the plurality of qudits, and the one or more programs further include instructions for using each respective estimate of the portion of the entire Pauli error distribution or the entire Pauli error distribution for each respective quantum operation in the set of at least one quantum operation to optimize a plurality of parameters associated with the plurality of drive fields. In some embodiments, the plurality of drive fields includes a different drive field for each qudit in the plurality of qudits. In some embodiments, the plurality of parameters includes, for each drive field in the plurality of drive fields, an overall magnitude of a resonant quadrature, an off-resonant quadrature, a carrier signal phase, or a quadrature's phase.

In some embodiments, the method further comprises using the respective estimate of an entire Pauli error distribution for each respective quantum operation to adjust the plurality of drive fields.

In some embodiments, a gate in the plurality of gates is an element of SU(2) or SU(4). In some embodiments each gate in the plurality of gates is an element of the unitary group.

In some embodiments, the plurality of qudits is two or more physical qudits, four or more physical qudits, or 25 or more physical qudits.

In some embodiments, the set of at least one quantum operation is a single quantum operation. In some embodiments, the set of at least one quantum operation is a plurality of quantum operations. In some embodiments, the set of at least one quantum operation is 2, 3, 4, 5, or more than 5 quantum operations.

In some embodiments, the identifying the plurality of interacting systems (i) comprises constructing a corresponding graph G comprising a corresponding plurality of nodes and a corresponding plurality of edges, each respective node in the corresponding plurality of nodes represents a corresponding interacting system in the plurality of interacting systems during the respective quantum operation, and each edge in the corresponding plurality of edges denotes crosstalk that couples a first interacting system associated with a first node and a second interacting system associated with a second node in the corresponding graph. In some embodiments, the corresponding set of components includes each component, in each node in each subgraph of the corresponding graph, that has an order that is less than or equal to a predetermined maximum component order in the corresponding graph. In some embodiments, the respective components in the corresponding set of components that interact with the respective component are within a predetermined environment distance within the quantum computer system to the respective component. In some embodiments, each edge in the corresponding plurality of edges denotes nonlocal crosstalk that couples a first interacting system associated with a first node and a second interacting system associated with a second node in the corresponding graph. In some embodiments, the predetermined maximum component order in the corresponding graph is a positive integer between 2 and 8.

Another aspect of the present disclosure provides a method for estimating one or more error processes, including crosstalk, occurring in a quantum computer system. In this aspect of the present disclosure, the quantum computer system comprises a plurality of qudits. Each qudit in the plurality of qudits has a dimension of $N$, where $N$ is a positive integer of 2 or greater. The method comprises, at a digital computer system comprising one or more digital processors and a memory, the memory comprising nontransitory instructions configured to perform a procedure for each respective quantum operation in a set of at least one quantum operation. The procedure comprises instructions for (i) identifying a plurality of interacting systems within the plurality of qudits during the respective quantum operation, wherein each respective interacting system in the plurality of interacting systems comprises a corresponding subset of the plurality of qudits, (ii) identifying a corresponding set of components from the plurality of interacting systems; (iii) for each respective component in the corresponding set of components, evolving the respective component along with the respective components in the corresponding set of components that interact with the respective component in the respective quantum operation, thereby forming a plurality of maps for the respective set of components; (iv) calculating, for each respective component in the corresponding set of components, a corresponding marginal distribution using the corresponding map for the respective component, thereby computing a plurality of marginal distributions for the corresponding set of components; and (v) constructing a respective estimate of all or a portion of an entire Pauli error distribution for the respective quantum operation from the plurality of marginal distributions for the corresponding set of components.

Another aspect of the present disclosure provides a nontransitory computer readable storage medium storing one or more programs, the one or more programs comprising instructions, which when executed by a digital computer system with one or more digital processors, cause the digital computer system to perform a method of estimating one or more error processes, including crosstalk, occurring in a quantum computer system, the quantum computer system comprising a plurality of qudits. Each qudit in the plurality of qudits has a dimension of N, where N is a positive integer of 2 or greater. The method comprises, for each respective quantum operation in a set of at least one quantum operation, instructions for: (i) identifying a plurality of interacting systems within the plurality of qudits during the respective quantum operation, wherein each respective interacting system in the plurality of interacting systems comprises a corresponding subset of the plurality of qudits; (ii) identifying a corresponding set of components from the plurality of interacting systems; (iii) for each respective component in the corresponding set of components, evolving the respective component along with the respective components in the corresponding set of components that interact with the respective component in the respective quantum operation, thereby forming a plurality of maps for the respective set of components; (iv) calculating, for each respective component in the corresponding set of components, a corresponding marginal distribution using the corresponding map for the respective component, thereby computing a plurality of marginal distributions for the corresponding set of components; and (v) constructing a respective estimate of all or a portion of an entire Pauli error distribution for the respective quantum operation from the plurality of marginal distributions for the corresponding set of components.

Another aspect of the present disclosure provides a digital computer system for estimating one or more error processes, including crosstalk, occurring in a quantum computer system. The quantum computer system comprises a plurality of qudits. Each qudit in the plurality of qudits has a dimension of N, where N is a positive integer of 2 or greater. The digital computer system comprises one or more digital processors, a memory, and one or more programs. The one or more programs are stored in the memory and are configured to be executed by the one or more digital processors. The one or more programs include, for each respective quantum operation in a set of at least one quantum operation, instructions for (i) constructing a corresponding graph G comprising a corresponding plurality of nodes and a corresponding plurality of edges, where each respective node in the corresponding plurality of nodes represents a corresponding interacting system during the respective quantum operation, where the corresponding interacting system comprises a corresponding subset of the plurality of qudits, and where each edge in the corresponding plurality of edges denotes crosstalk that couples a first interacting system associated with a first node and a second interacting system associated with a second node in the corresponding graph, (ii) identifying a corresponding set of components from the corresponding graph G, where the corresponding set of components includes each component, in each node in each subgraph of the corresponding graph, that has an order that is less than or equal to a predetermined maximum component order in the corresponding graph, (iii) for each respective component in the corresponding set of components, evolving the respective component along with the components at each of the nodes within a predetermined environment distance within the quantum computer system to the respective component in the corresponding graph, thereby forming a plurality of maps for the respective set of components, (iv) calculating, for each respective component in the corresponding set of components, a corresponding marginal distribution using the corresponding map for the respective component, thereby computing a plurality of marginal distributions for the corresponding set of components, and (v) constructing a respective estimate of all or a portion of an entire Pauli error distribution for the respective quantum operation from the plurality of marginal distributions for the corresponding set of components.

BRIEF DESCRIPTION OF THE DRAWINGS

Like reference numerals refer to corresponding parts throughout the several views of the drawings.

DETAILED DESCRIPTION

Figures 1A, 1B, 1C, 1D:
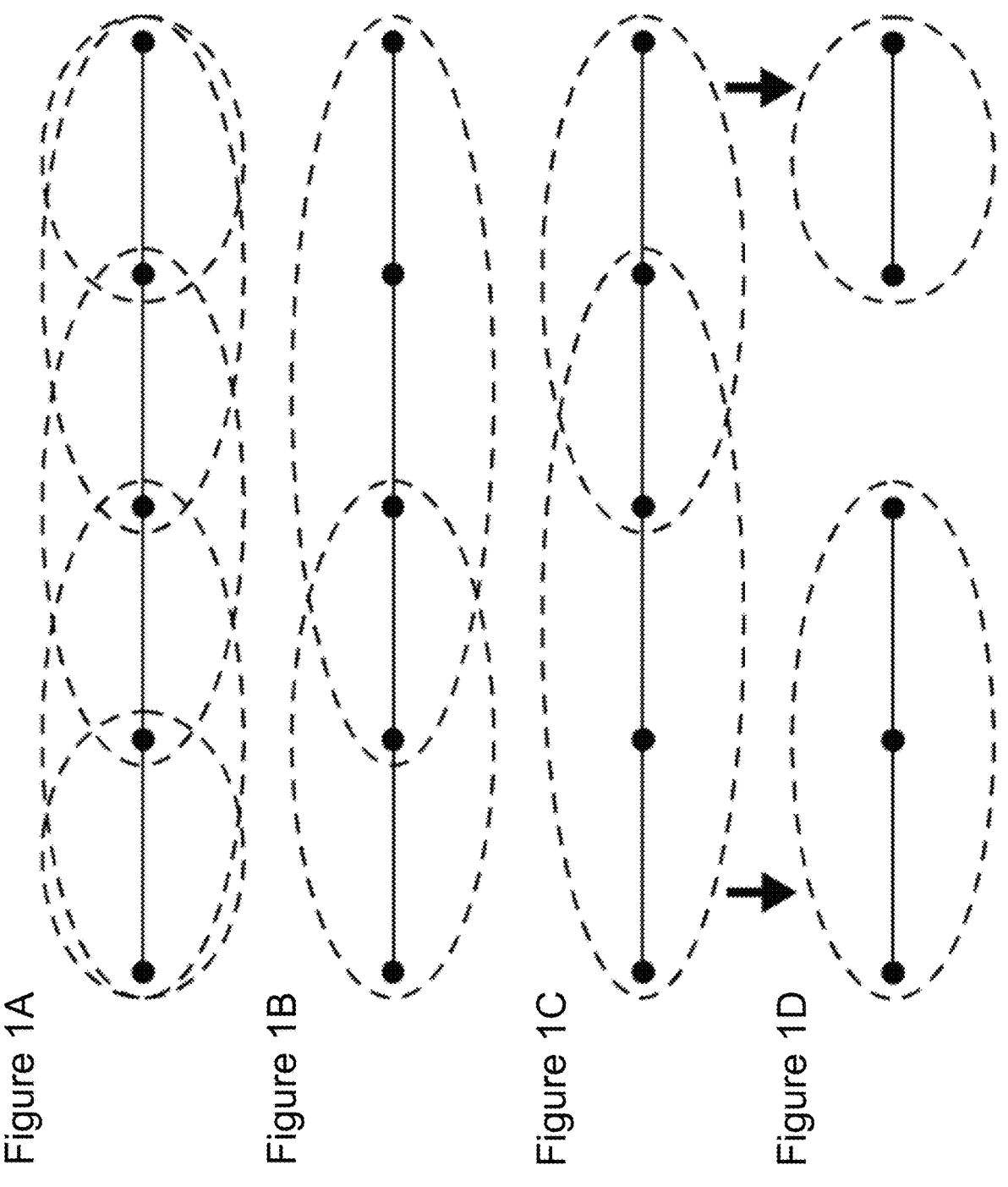
FIGS. 1A, 1B, 1C, and 1D collectively illustrate a schematic depicting expansions with order (1, 1) and (1, 2) of a quinquepartite system with nearest-neighbor (NN) coupling, in accordance with an exemplary embodiment of the present disclosure.

Reference will now be made in detail to embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the embodiments.

It will also be understood that, although the terms first, second, etc. may be used herein to describe various elements, these elements should not be limited by these terms. These terms are only used to distinguish one element from another. For example, a first subject could be termed a second subject, and, similarly, a second subject could be termed a first subject, without departing from the scope of the present disclosure. The first subject and the second subject are both subjects, but they are not the same subject.

The terminology used in the present disclosure is for the purpose of describing particular embodiments only and is not intended to be limiting of the invention. As used in the description of the invention and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

An aspect of the present disclosure is directed to providing efficient systems and methods for optimizing an implementation of nontrivial parallel operations. Another aspect of the present disclosure is directed to providing efficient systems and methods for optimizing an implementation of nontrivial parallel operations under general crosstalk.

One aspect of the present disclosure provides general and scalable systems and methods for implementing high-fidelity simultaneous gates on qubits experiencing crosstalk effects. In some embodiments, the present disclosure exploits the tensor product structure of classical crosstalk to simulate and optimize gates efficiently. Accordingly, the present disclosure remedies the problem of constructing $SU(2)^{\otimes N}$ on superconducting qubits. Furthermore, the systems and methods of the present disclosure optimize concurrent multiqubit gates and modify an approach to account for nonclassical crosstalk. Taking experimental restrictions into account, a simple control ansatz is provided that allows for reducing the effect of crosstalk dramatically. Moreover, average Hamiltonian theory is applied to simplify the optimization procedure further and gain insight into the cancellation. The infidelity is improved by more than an order of magnitude despite strong crosstalk for a model of superconducting qubits with realistic parameters.

Furthermore, the present disclosure provides scalable systems and methods for accurately modeling idle and operation crosstalk on a plurality of experimental devices. In some embodiments, the present disclosure exploits a tensor product structure of local (e.g., classical) crosstalk to efficiently express its impact on gates. Through a perturbative expansion, the present disclosure is applicable to non-local (e.g., quantum) crosstalk and captures its effects to arbitrary order (e.g., any desirable order). In some embodiments, provided there is a sufficient degree of control, the present disclosure can minimize an effect of these errors. Moreover, the present disclosure illustrates applications of the systems and methods described herein through a series of simulations of parallel gates on a square array of one hundred superconducting transmon qubits.

In a first example, the present disclosure applies a gradient-based optimization to an experimentally significant problem of implementing arbitrary elements of $SU(2)^{\otimes N}$ on superconducting transmon qubits. Despite substantial local crosstalk, the present disclosure illustrates that error rates near the crosstalk-free limit are possible with conventional control hardware. Furthermore, the present disclosure illustrates how to tuneup simultaneous cross-resonance gates and, again, obtain dramatically improved error rates. The results described herein suggest that contrary to prevailing opinions, crosstalk need not be a prohibitive limitation on noisy intermediate-scale quantum (NISQ) era devices. See Murali et al., 2020, "Architecting Noisy Intermediate-Scale Trapped Ion Quantum Computers," ArXiv preprint, ArXiv: 2004.04706, print; Preskill, J., 2018, "Quantum Computing in the NISQ Era and Beyond," Quantum, 2, pg. 79, each of which is hereby incorporated by reference in their entirety.

Based on the present disclosure, higher quality quantum information processors can be made possible by using the systems and methods described herein to better balance the tradeoffs in a fabrication of a device and pulse design.

Theory of Crosstalk. The present disclosure addresses a foundational problem: what crosstalk directly affects physical qubits (e.g., as opposed to measurement or line crosstalk), and is the crosstalk efficiently simulatable or mitigatable? Typically, crosstalk is classified as either quantum or classical. Classical (local) crosstalk arises if a semiclassical drive field interacts with multiple qubits, introducing unitary errors on nontarget qubits, but not entangling independent systems. Quantum crosstalk entangles qubits and originates from, for example, the effect of a static coupling when it is not being used to induces a cross-resonant interaction. See, Chow et al., 2011, "Simple All-Microwave Entangling Gate for Fixed-Frequency Superconducting Qubits," Physical Review Letters, 107, pg. 080502, which is hereby incorporated by reference in its entirety.

Although classical crosstalk produces correlated noise, the crosstalk can be factorized and simulated efficiently on a digital computer. The induced correlations are classical and, therefore, do not entangle the individual subsystems. Concretely, the present disclosure models classical crosstalk via the Hamiltonian $$H(t, \vec{x}) = \sum_n H_n(t, \vec{x}). \qquad (1)$$

Each local Hamiltonian $H_n$ acts exclusively on subsystem n, and $\vec{x}$ denotes shared classical parameters that result in crosstalk. Typically, $\vec{x}$ consists of variables that define the drive fields. The average process fidelity $\Phi$ between a target operation $U=U_1 \otimes \ldots \otimes U_N$ and the noisy implementation $\tilde{U}=\tilde{U}_1 \otimes \ldots \otimes \tilde{U}_N$, where $\tilde{U}_n=T \exp[\int d\tau H_n(\tau, \vec{x})]$, can be expressed as $$\Phi(U, \tilde{U}) = \prod_n \Phi(U_n, \tilde{U}_n). \qquad (2)$$

See, Nielsen et al., 2002, "Quantum Computation and Quantum Information: 10th Anniversary Edition," Cambridge University Press, 10th edition, print; Carignan-Dugas et al., 2019, "Bounding the average gate fidelity of composite channels using the unitarily," New Journal of Physics, 21, pg. 053016; each of which is hereby incorporated by reference in its entirety. The equation holds more generally when $\{\tilde{U}_n\}$ are CPTP maps.

Unlike its classical counterpart, a digital computer cannot efficiently simulate an extensive system affected by quantum crosstalk. Thus, the present disclosure provides a perturbative approach for optimizing the controls of a system experiencing localized quantum crosstalk.

For convenience, an approach of the present disclosure is defined through a graphical model of the noise. However, the graph based approach is simply for presentation of the method and the present disclosure is not limited to graph based approaches. Turning to the graph based approach, a graph G is formed where each node represents a strongly interacting subsystem, such as a two-qubit pair entangled by a cross-resonant coupling. The target operation on the entire system is factorizable over the tensor product space defined by the node subsystem partitioning. Edges denote the quantum crosstalk that inadvertently couple the subsystems. Accordingly, a constraint is imposed that the crosstalk is local: a maximum degree of the graph lies below a constant $\Delta_{max}$ that quantifies available computational resources and depends on the expansion order. In contemporary architectures, the constraint is satisfied since a majority of nodes have a degree of at most four.

The expansion order is designated by a pair (d, o), with d specifying the environment depth and o the minimum partition order. A further graph G' is formed by repeatedly cutting G into components such that no cut creates a component with an order less than o. The cutting procedure terminates if no further cuts are possible. The behavior of a component in G' is approximated by evolving the component along with all vertices of distance at most d. These neighboring vertices constitute the environment, and tracing them out approximates the reduced dynamics of the component. A factorizable initial system-environment state is assumed and the environmental degrees of freedom determine a maximally noncommutative state. Using the tensor product factorization over G', an objective function analogous to (25) is formed. In general, the graph G' is not unique, and the objective function should average over all valid graphs or utilize additional information about the noise structure.

As discussed above, the present disclosure is not limited to graph based approaches. For example, an algorithm could simulate a target system (e.g., node in the graph) and other qudits that appear to or are expected to interact with it. For example, one could run simultaneous random benchmark compiling and use the resulting data to find "environment" qubits that induce most of the noise on the target system. One could then optimize their controls without ever making the graph. Random benchmarking and related error correction protocols are disclosed in U.S. Pat. Nos. 10,360,088 and 10,031,791, each of which is hereby incorporated by reference.

Referring to FIGS. 1A through 1C, a collective illustration is provided as to how to apply the present disclosure to a chain of coupled systems. FIGS. 1A through 1D collectively show the graph of a quinquepartite chain and describes how to approximate the collective behavior. For a sufficiently large chain, a (d, o)-order expansion requires the complete simulating of at most 2d+o subsystems.

FIGS. 1A through 1D collectively depict a schematic of expansions with order (1, 1) and (1, 2) of a quinquepartite system with nearest-neighbor (NN) coupling. In FIG. 1A, the collective dynamics is approximated by evolving each subsystem and its nearest neighbors (NNs) before tracing out their environment (e.g., neighbors). In FIGS. 1B and 1C, a second-order estimate of the overall dynamics is performed by evolving bipartite and tripartite subsystems and their NNs. FIGS. 1B and 1C show two different partitionings that are averaged over to better approximate the actual dynamics. Further, FIG. 1D illustrates the partitioning of FIG. 1C after tracing out each environment. By exploiting the multiplicativity of the process fidelity, the systems and methods of the present disclosure estimate and maximize the quantity without constructing the complete system.

Now that details of the basic theory of crosstalk has been disclosed, details regarding a practical application for mitigating the effects of crosstalk on superconducting transmon qubits, in accordance with an embodiment of the present disclosure, are disclosed. The present disclosure describes the systems and methods with a focus on transmons for the sake of clarity. However, the present disclosure is not limited thereto. For instance, in some embodiments, the systems and methods of the present disclosure are applicable to genuine two-level qubits and, with appropriate modification, other multilevel implementations such as trapped ions.

A typical implementation of single-qubit operations on transmons will now be described. A local oscillator acts as a single tone microwave source outputting a constant signal $\cos(\omega't)$ that is shaped by an arbitrary waveform generator via an IQ mixer. A description of a transmon qubit is an harmonic oscillator driven by microwave pulses. In the lab frame, the relevant Hamiltonian is $$H = \omega\hat{n} + \frac{\alpha}{2}(\hat{n} - 1)\hat{n} + \Omega(t)\cos(\omega't + \gamma)(\hat{a} + \hat{a}^\dagger), \tag{3}$$

where $\hat{a}$ is the annihilation operator of the oscillator, $\hat{n}=\hat{a}^\dagger\hat{a}$, $\alpha$ is the anharmonicity, $\gamma$ is the drive's phase, $\omega$ is the oscillator's resonant frequency, $\Omega(t)$ specifies the drive envelope, and set $\hbar=1$.

The first two energy levels form the qubit subspace. For a sufficiently large anharmonicity, the leading-order effect of leakage is modeled by the inclusion of the third energy level, and the qutrit state evolves under the truncated Hamiltonian $$H = -\frac{\omega}{2}\sigma^z + \frac{3\omega + 2\alpha}{2}|2\rangle\langle2| + \Omega(t)\cos(\omega't + \gamma)(\sigma_1^x + \lambda\sigma_2^x), \tag{4}$$

where $$\sigma_k^x = |k - 1\rangle\langle k| + |k\rangle\langle k - 1|,$$

and $\lambda$ is the relative strength at which the control drives the $|1\rangle-|2\rangle$ leakage transition (assume $\lambda=\sqrt{2}$ throughout the present disclosure). In the qubit rotating frame, after making a rotating wave approximation, the Hamiltonian becomes $$H = \frac{1}{2}\Omega(t)e^{-i(\gamma+(\omega'-\omega)t)}(|0\rangle\langle1| + \lambda e^{i\alpha t}|1\rangle\langle2|) + h.c. \tag{5}$$

To understand how the control creates single-qubit gates, consider a resonant pulse ($\omega=\omega'$), and $\lambda=0$, which corresponds to an ideal sufficiently long pulse. The control generates X and Y gates by modulating the coupling between the zero and one states, while the drive phase fixes the rotation axis in the XY-plane, and the pulse area sets the rotation angle. For example, $\gamma=0$ and $\gamma=\pi/2$ result in rotations about the X- and Y-axis. Rotations about the remaining Z-axis correspond to a change in the relative phase between the states. Rather than manipulating the state of the transmon, an equivalence is to rotate the control with respect to the state, realizing a virtual-Z gate. See, Knill et al., 2000, "An algorithmic benchmark for quantum information processing," Nature, 404, pg. 368; Knill et al., 2008, "Randomized benchmarking of quantum gates," Physical Review A, 77, pg. 012307; Johnson et al., 2015, "Demonstration of robust quantum gate tomography via randomized benchmarking," New Journal of Physics, 17, pg. 113019; McKay et al., 2016, "Universal Gate for Fixed-Frequency Qubits via a Tunable Bus," Physical Review A., 6, pg. 064007; each of which is hereby incorporated by reference in its entirety. This equivalence is physically accomplished by adding a phase offset to all subsequent gates.

A pulse with an area $\int d\tau \Omega(\tau) = \pi/2$ and a relative phase offset $\gamma$ generates the unitary $V(\gamma) = Z_{-\gamma} X_{\pi/2} Z_{\gamma}$, with the notation $A_\theta = \exp(-i\theta/2)$. Combining two of these phase offset $\pi/2$ pulses and a final virtual-Z realizes any element of SU(2), $$U(\alpha, \beta, \gamma) = Z_{\alpha+\beta+\gamma} V(\alpha + \beta) V(\alpha) \tag{6}$$

$$= Z_\gamma X_{\pi/2} Z_\beta X_{\pi/2} Z_\alpha.$$

Now that details regarding superconducting qubits have been disclosed, details regarding single-qubit gate engineering, in accordance with an embodiment of the present disclosure, are disclosed. The semiclassical Hamiltonian governing transmon n with classical crosstalk is $$H_n = \tag{7}$$

$$-\frac{\omega_n}{2}\sigma^z + \frac{3\omega_n + 2\alpha_n}{2}|2\rangle\langle 2| + \sum_j \beta_{nj}\Omega_j(t)\cos(\omega'_j t + \phi_j + \theta_{nj})(\sigma_1^x + \lambda_j \sigma_2^x).$$

The parameter $\beta$ and $\theta$ characterize the crosstalk affecting the system. Accordingly, a particular case where each transmon has a local drive will now be described. However, the present disclosure is not limited thereto. The crosstalk parameters are $N \times N$ matrices and the constraints $\beta_{nn} = 1$ and $\theta_{nn} = 0$ are imposed. These constraints lead to interpreting $\beta$ as the relative drive strength and $\theta$ is the phase lag. Experimental data supports the model. See, Xia et al., 2015, "Randomized Benchmarking of Single-Qubit Gates in a 2D Array of Neutral-Atom Qubits," Physical Review Letters, 114, pg. 100503; Magesan et al., 2018, "Effective Hamiltonian models of the cross-resonance gates," arXiv preprint arXiv:1804.04073, print; Xue et al., 2019, "Benchmarking Gate Fidelities in a Si/SiGe Two-Qubit Device," Physical Review X, 9, pg. 21011; each of which is hereby incorporated by reference in its entirety.

Accordingly, besides $\beta$ and $\theta$, the parameters in (7) with standard Ramsey tomography can be estimated. First consider the case where there are no extraneous qubit-qubit interactions. Each element of the crosstalk parameters is isolated by only turning on drive j, and measuring transmon n. In the rotating frame of the transmon, neglecting leakage, and making a rotating-wave approximation, the Hamiltonian is $$H_n = \frac{1}{2}\beta_{nj} \cdot \Omega_j(t)[\cos((\Delta_{nj}t + \theta_{nj})\sigma^x + \sin(\Delta_{nj}t + \theta_{nj})\sigma^y], \tag{8}$$

with $$\Delta_{nj} = \omega'_j - \omega_n,$$

and $\phi_j = 0$.

If it is not possible to tune the drive frequency, then a numerical fitting procedure is necessary. Otherwise, if the drive frequency is tuned so that $$\omega'_j = \omega_n$$

and that the drive amplitude $\Omega_j(t) = \Omega_j$ is constant, the expectation of the Pauli matrices at a later time t are $$\langle \sigma^x \rangle = \sin \theta_{nj} \sin(\beta_{nj}\Omega_j t),$$

$$\langle \sigma^y \rangle = -\cos \theta_{nj} \sin(\beta_{nj}\Omega_j t),$$

$$\langle \sigma^z \rangle = \cos(\beta_{nj}\Omega_j t) \tag{9}$$

The parameter $\beta_{nj}$ and $\theta_{nj}$ are determined via fitting, and an exponential resealing should be incorporated to account for decoherence. Repeating the procedure for all $N^2$ crosstalk interactions gives estimates for all elements of $\beta$ and $\theta$.

Details regarding static qubit-qubit coupling are now provided. In several experimental architectures, constant qubit-qubit couplings facilitate two-qubit operations, such as the cross-resonance gate. See, Rigetti et al., 2015, "Protocol for Universal Gates in Optimally Biased Superconducting Qubits," Physical Review Letters, 94, pg. 240502, which is hereby incorporated by reference in its entirety. However, such a static coupling can adversely affect an ability to characterize crosstalk precisely, especially if $\beta \lesssim 0.1$. Therefore, decoupling the interaction, provided $t_\pi|\omega| \ll 1$, where $t_{\pi/2}$ is the time it takes to apply a $\pi$ rotation with drive n to qubit n, is desired. In practice, fast $\pi$ pulses are feasible on transmons by implementing DRAG corrections. Accordingly, a case of a single static ZZ interaction is analyzed. The joint Hamiltonian of the target and coupled systems is $$H = H_n \otimes I + \frac{\kappa}{2}\sigma^z \otimes \sigma^z, \tag{10}$$

where $\kappa$ is the strength of the qubit-qubit coupling, and classical crosstalk affecting the coupled qubit is neglected since any effects on the target are second order.

The correction scheme for measuring the $\sigma^y$ observable is analogous to the procedure for $\sigma^x$. For simplicity, consider the limiting case $t_\pi \to 0$. A round of decoupled evolution consists of a time $\Delta t$ where the system evolves under (10), an $X_\pi$, further evolution under (10) for a time $\Delta t$ and finally an $X_\pi$. The lowest-order contribution to the average Hamiltonian during the round is $$\overline{H}^{(0)} = \frac{\beta_{nj}\Omega_j \cos\theta_{nj}}{2}\sigma^x \otimes I. \tag{11}$$

Thus, by performing N rounds with a sufficiently small $\Delta t$, the system evolves approximately under (11). The desired observable is $$\langle \sigma^y \rangle = -\cos\theta_{nj}\sin(\beta_{nj}\Omega_j T) + O(T\Delta t), \tag{12}$$

and the total experiment time is $T = 2N\Delta t$. Higher-order cancellation of the coupling is possible with e.g., Richardson extrapolation.

Now, details regarding the technical aspects of optimizing crosstalk are disclosed.

The first two orders of the effective Hamiltonian are $$\overline{H}_n^{(0)} = \int_{t_0}^{t_0+t_g} dt_1 H_n(t_1), \tag{13}$$

-continued $$\overline{H}_n^{(1)} = \frac{i}{2}\int_{t_0}^{t_0+g} dt_1 \int_{t_0}^{t_1} dt_2 [H_n(t_1), H_n(t_2)]. \tag{14}$$

Consider a target operation U and its approximation $\overline{U}$ obtained via average Hamiltonian theory where $$\overline{U} = \bigotimes_n \prod_m \exp(-i\overline{H}_{nm}) \qquad U = \bigotimes_n U_n. \tag{15}$$

Rather than maximizing the fidelity, the logarithm of the overlap is maximized which shares the same extrema but is linear in its subsystems and has the convenient form $$g(\vec{x}) = \log|trU^\dagger \overline{U}| \tag{16}$$
$$= \sum_n \log\left|trU_n^\dagger \prod_m \exp(-i\overline{H}_{nm})\right|$$
$$= \sum_n \log|g_n(\vec{x})|$$

which is well-defined for non-orthogonal unitaries, and implicitly define $g_n(\vec{x})$. The partial derivative with respect to some scalar x is $$\partial_x g(\vec{x}) = \tag{17}$$
$$\sum_n \frac{1}{|g_n|^2}\mathrm{Re}\left[g_n^* tr\left(U_n^\dagger \sum_m \cdots e^{-i\overline{H}_{n(m+1)}}\left(\partial_x e^{-i\overline{H}_{nm}}\right)e^{-i\overline{H}_{n(m-1)}} \cdots \right)\right].$$

The following lemmas assist in computation of the gradient for a general Hamiltonian. The first provides a numerical routine for evaluating the gradient. The second allows for eliminating the final virtual-Z angle from the optimization problem.

Lemma 1 Let $H$ be a Hermitian matrix with aneigendecomposition $H = UDU^\dagger$ then $$\partial_x e^{-iH} = \sum_{j\neq k} \frac{e^{-i\lambda_j} - e^{-i\lambda_k}}{\lambda_j - \lambda_k}\langle u_j|\partial_x H|u_k\rangle|u_j\rangle\langle u_k| - \tag{18}$$
$$i\sum_j e^{-i\lambda_j}\langle u_j|\partial_x H|u_j\rangle|u_j\rangle\langle u_j|,$$

where $D = \sum_j \lambda_j|j\rangle\langle j|, |u_j\rangle = U|j\rangle.$

Virtual-Z correction.

Lemma 2 Let $A \in$ $\mathbb{C}^{2\times2}$ then the overlap between $A$ and $Z_\theta$ satisfies $$|trZ_\theta^\dagger A| \leq (|A_{11}| + |A_{22}|)^2 \tag{19}$$

and the bound is saturated when $$\theta = -\arg\frac{\sqrt{A_{22}^*/A_{11}^*}}{\sqrt{A_{22}/A_{11}}}. \tag{20}$$

The present disclosure considers a problem of implementing an arbitrary element of $SU(2)^{\otimes N}$ concurrently on an ensemble of qubits where their respective drive fields weakly interact with other qubits.

In some embodiments, the present disclosure considers a related problem of how one can implement an arbitrary element of $SU(2)^{\otimes N}$ concurrently on an ensemble of qubits if their respective drive fields weakly interact with other qubits? Central to an approach of the present disclosure for the problem is the observation that a digital computer can efficiently simulate the dynamics under the experimentally relevant semiclassical drive approximation. Rather than modeling an explicit tensor product space, each subsystem independently is modeled, and there is no inherent obstacle to computing corrections that maximize the fidelity of the entire system.

It is necessary to pick control parameters to optimize. On the one hand, forming pulse shapes that yield error rates near the decoherence limit for short gate times is desirable. On the other hand, one must consider experimental realities, such as restrictions on engineering pulse transfer functions and the degree of calibration needed to implement complicated pulses accurately. Accordingly, control to the phases in (6) is restricted. By appropriately adjusting the phases, unitary error is accountable that is independent of the phases by compiling the inverse gate into the implementation. Moreover, since the phases is only changed, the pulse envelopes remain constant and, therefore, require minimal calibration.

A Magnus expansion trick that avoids time integration over the gate time is applied. Applying the average Hamiltonian theory, the effective Hamiltonian is $$\overline{H}_n = \overline{H}_n^{(0)} + \overline{H}_n^{(1)} +$$

satisfying $\tilde{U}_n = \exp(-it\overline{H}_n)$ during an interval. Upon moving into the qutrit's rotating frame, and making a rotating-wave approximation the first two terms have the form $$\overline{H}_n^{(0)} = \sum_j\left[e^{-i\phi_j}\left(a_{nj}|0\rangle\langle 1| + b_{nj}|1\rangle\langle 2|\right) + h.c.\right], \tag{21}$$

$$\overline{H}_n^{(1)} = \sum_{j,k} e^{-i(\phi_j-\phi_k)}(b_{njk}\sigma_1^z + c_{njk}\sigma_2^z) + \sum_{j,k}[e^{-i(\phi_j+\phi_k)}d_{njk}|0\rangle\langle 2| + h.c.], \tag{22}$$

where a, b, c and d are calculated by numerical integration and depend on model parameters except for $\phi_j$. Thus, control of the phases is optimized without needing to repeatedly solve the system.

A situation where subsystems are somewhat addressable is now described. Consider a driving field intended for one subsystem interacting with others with a relative amplitude on the order of 10%.

Figure 2:
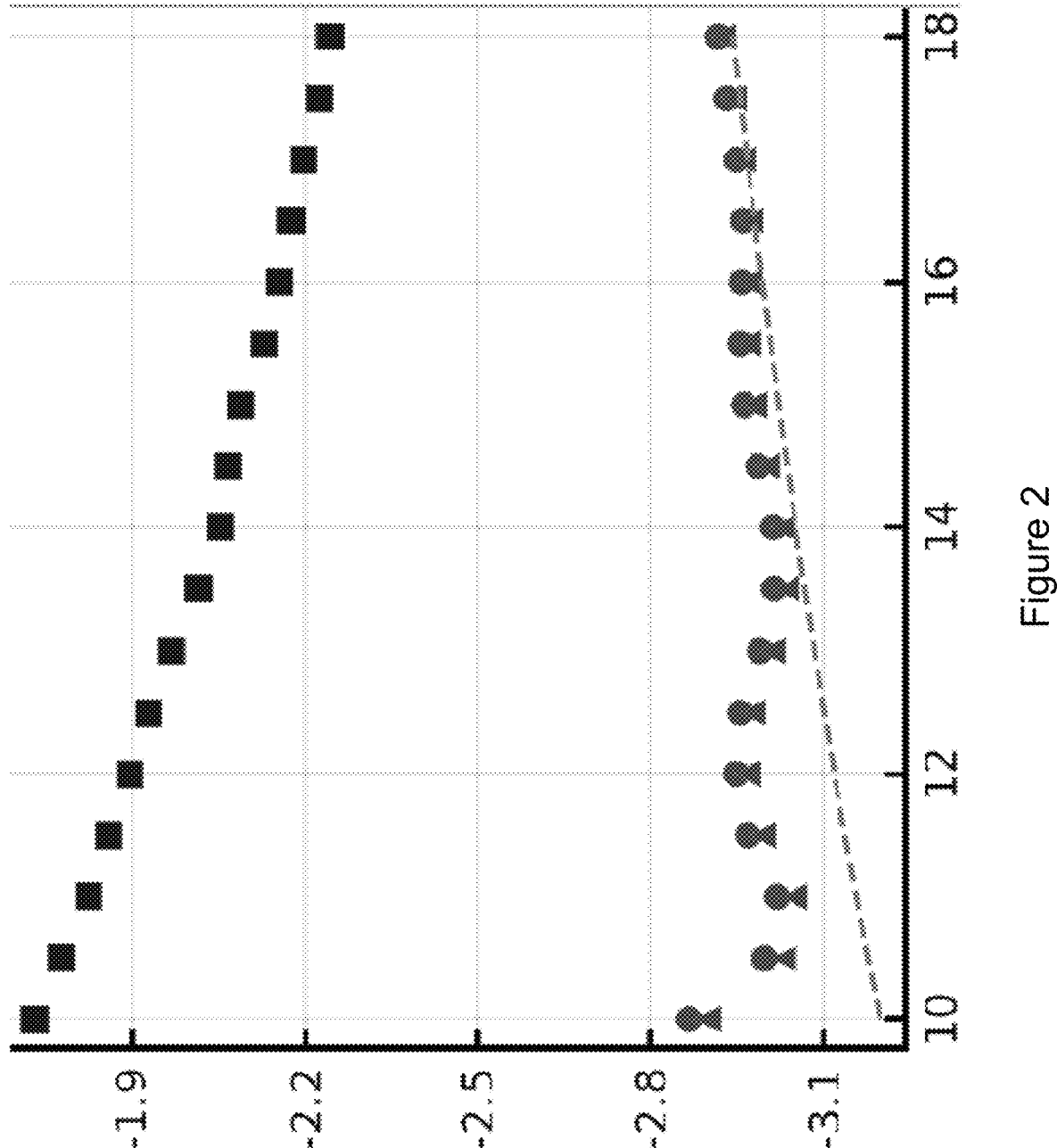
FIG. 2 illustrates a plot of an average process infidelity of a 3-qubit logical subspace for a system of three superconducting qutrits, in accordance with an exemplary embodiment of the present disclosure.

FIG. 2 illustrates a plot of the average process infidelity of the 3-qubit logical subspace for a system of three superconducting qutrits. FIG. 2 depicts the raw unoptimized infidelity (e.g., squares), the first-order Magnus-based optimized infidelity (e.g., circles), the optimal infidelity found by an exhaustive numerical search (e.g., triangles), and the decoherence-limited bound on infidelity ((e.g., the dashed line). A minimum mean infidelity of $6.04\times10^{-4}$ occurs when $t_{\pi/2}=11$ ns.

Accordingly, the system and methods of the present disclosure is exemplified with a simulation of superconducting qubits. In this first example, consider N=3 transmons that evolve under (7), and realistic parameter values. See, Takita et al., 2016, "Demonstration of Weight-Four Parity Measurements in the Surface Code Architecture," Physical Review Letters, 117, pg. 210505; Takita et al., 2017, "Experimental Demonstration of Fault-Tolerant State Preparation with Superconducting Qubits," Physical Review Letters, 119, pg. 180501; each of which is hereby incorporated by reference in its entirety. Set $\vec{\omega}/2\pi$=4.9, 4.1, 4.2 GHz, $\alpha/2\pi$=330 MHz. In each iteration of this example, the target gate is chosen uniformly at random from $SU(2)^{\otimes 3}$. The crosstalk phase lag parameter $\theta_{jk}$ is sampled uniformly from $(0, 2\pi]$, and draw $\beta_{jk}$ from a normal distribution centered at zero and (std $\beta_{jk}$)=0.05. Each oscillator is assumed to exhibit elementary Markovian dephasing and amplitude damping with $T_1$=50 μs, and $T_2$=60 μs. There are two discrete periods of successive evolution, each taking time $t_{\pi/2}$. The two discrete periods differ in their choice of control envelopes $\Omega_j(t)$, and phase offsets $\phi_j$. In this example, the control envelopes are gaussian, with std $\Omega_j=t_{\pi/2}/4$ and implement $\pi/2$ pulses. The phase offsets $\phi_j$ are optimized to approximate a target operation up to a virtual-Z rotation.

In FIG. 2, a plot of the infidelity as a function of $t_{\pi/2}$ is illustrated. The raw unoptimized infidelity, illustrated as squares, without correcting the phases is much larger than the optimal infidelities, illustrated as a circle and a triangle. The circles are obtained through the Magnus expansion approach described herein, while the triangles correspond to an exhaustive numerical search. An exhaustive search with gradient ascent of analytic controls (GOAT) is performed. See, Machnes et al., 2018, "Tunable, Flexible, and Efficient Optimization of Control Pulses for Practical Qubits," Physical Review Letters, 120, pg. 150401, which is hereby incorporated by reference in its entirety. Although the exhaustive method returns marginally lower infidelities, the relative computation time exceeds $10^2$ and surpasses $10^4$ for more extensive systems on the order of ten qubits. The decoherence limited lower bound on the average process fidelity is further plotted, which is given by $$F(t_g) = \left[\frac{1}{4} + \frac{3}{8}e^{-\Gamma_1 t_g} + \frac{3}{8}e^{-(\Gamma_1/2 + \Gamma_2)t_g}\right]^N, \quad (23)$$

where $t_g$=$2t_{\pi/2}$. Accordingly, an optimal average infidelity is found to be $6.04\times10^{-4}$ with a gate time of 22 ns for implementing an element of $SU(2)^{\otimes 3}$.

A vital property for the experimental application of a pulse engineering method is its robustness to imprecision in the model parameters. For instance, in some embodiments the model adds normally distributed noise to β and θ, applies a least square fit to obtain estimates of β and θ.

The ability to address individual qubits is imperative for scalable quantum information processing. On practically all experimental implementations, optimal two-qubit gates require closely spaced qubits, but close spacings reduce single-qubit addressability and induce classical-crosstalk in which signals intended for one qubit inadvertently influence others. Accordingly, the present disclosure provides a general and scalable method for executing arbitrary operations in parallel while simultaneously suppressing classical and quantum crosstalk. Furthermore, computational experiments of the present disclosure show drastically lower error rates for superconducting qubits.

Also, the present disclosure considers what crosstalk acts on physical qubits during idling or the implementation of gates (e.g., as opposed to preparation or measurement crosstalk), and how one can efficiently simulate and consequently, try to mitigate it. It is natural to classify crosstalk as either local or non-local. See Sarovar et al. Local crosstalk can arise when a semi-classical drive field interacts with several qubits, causing unitary errors on supposedly idle qubits, but not entangling independent subsystems. Non-local crosstalk creates correlations that are nonfactorizable over system qubits and, in some embodiments, originate from, for example, the residual static coupling between two qubits or miscalibration.

Quantifying and reducing crosstalk requires a figure of merit. In some embodiments, the present disclosure evaluates the average fidelity of one-qubit or two-qubit gates, rather than the fidelity per clock cycle. While the present disclosure functions in either case, the descriptions presented infra focus on the former situation. For instance, local error measures relate directly to fault-tolerance thresholds, are easier to estimate experimentally, and are more common in the literature. The present disclosure illustrates that the average local fidelity can be approximated in a straightforward manner.

Local crosstalk. Although local crosstalk (typically) produces correlated noise, it can be factorized and simulated efficiently on a digital computer. The induced correlations are classical and do not entangle the individual subsystems. As such, some embodiments of the systems and methods of the present disclosure localize crosstalk via the Hamiltonian $$H(t, \vec{x}) = \sum_k H_k(t, \vec{x}). \quad (24)$$

Each term $H_k$ acts exclusively on subsystem k, and $\vec{x}$ denotes shared classical parameters that result in crosstalk. In some embodiments, the vector $\vec{x}$, for example, includes, or contains, the phases and amplitudes that specify drive fields. The average process fidelity $\Phi$ between a target operation $U=U_1 \otimes \ldots \otimes U_n$ and the noisy implementation $\tilde{U}=\tilde{U}_1 \otimes \ldots \otimes \tilde{U}_n$, where $\tilde{U}_k$=T exp$[-i\int d\tau H_k(\tau, \vec{x})]$, can be expressed as $$\Phi(U, \tilde{U}) = \prod_k \Phi(U_k, \tilde{U}_k). \quad (25)$$

See Neilson, M., 2002, "A Simple Formula for the Average Gate Fidelity of a Quantum Dynamical Operation," Physics Letters A, 303(4), pg. 249; Carignan-Dugas et al., 2019, "A Polar Decomposition for Quantum Channels (with Applications to Bounding Error Propagation in Quantum Circuits)," Quantum, 3, pg. 173, each of which is hereby incorporated by reference in its entirety. The equation holds more generally when $\{\tilde{U}_k\}$ are CPTP maps, for example, when a dissipative process also affects the system or the control parameters fluctuate over time.

Non-local crosstalk. Unlike local crosstalk, a digital computer cannot usually exactly simulate a large system affected by non-local crosstalk. Thus, the present disclosure provides a perturbative technique for simulating non-local crosstalk. An approximation scheme of the present disclosure characterizes a noise channel $\varepsilon$ by estimating a portion of the associated Pauli error rates $\{p_a\}$. The Pauli-twirled noise channel is $$\mathcal{P}(\rho) = \frac{1}{|\mathcal{P}^n|} \sum_{a \in \mathcal{P}^n} P_a^\dagger \mathcal{E}(P_a \rho P_a^\dagger) P_a \tag{26}$$

$$= \sum_{a \in \mathcal{P}^n} p_a P_a \rho P_a^\dagger, \tag{27}$$

where $\mathcal{P}^n$ is the Pauli group on n qubits. These error rates provide a partial description of the noise affecting a quantum system and can assist in experimental device calibration. On large experimental devices, the systems and methods of the present disclosure can scalably estimate the parameters in a way that is robust to state preparation and measurement (SPAM) errors. See Flammia et al., 2019, "Efficient Estimation of Pauli Channels," arXiv preprint, arXiv: 1907.12976, print, which is hereby incorporated by reference in its entirety. In some embodiments the quantities are combined to calculate holistic measures of device performance, such as the average two-qubit fidelity or global fidelity.

It is helpful to illustrate the systems and methods of the present disclosure using a graphical model of the noise. See Diestel, R., 2005, "Graph Theory. 2005," Grad. Texts in Math, 101, print, for basic graph theory definitions, which is hereby incorporated by reference in its entirety. The present disclosure constructs a graph G where each node is a strongly interacting subsystem during an operation of interest, such as a qubit during a single-qubit gate or a two-qubit pair entangled by a cross-resonance interaction. The entire target operation is factorizable over the tensor product space partitioning defined by the nodes. Edges denote non-local crosstalk that couples subsystems, and the systems and methods of the present disclosure only allow two-body coupling. The systems and methods of the present disclosure impose a constraint that the graph has limited connectivity (e.g., in a spatial and spectral sense) since the present disclosure relies on simulating subsystems. The constraint is satisfied in contemporary architectures where a majority of nodes have a degree of at most four.

Figure 3:
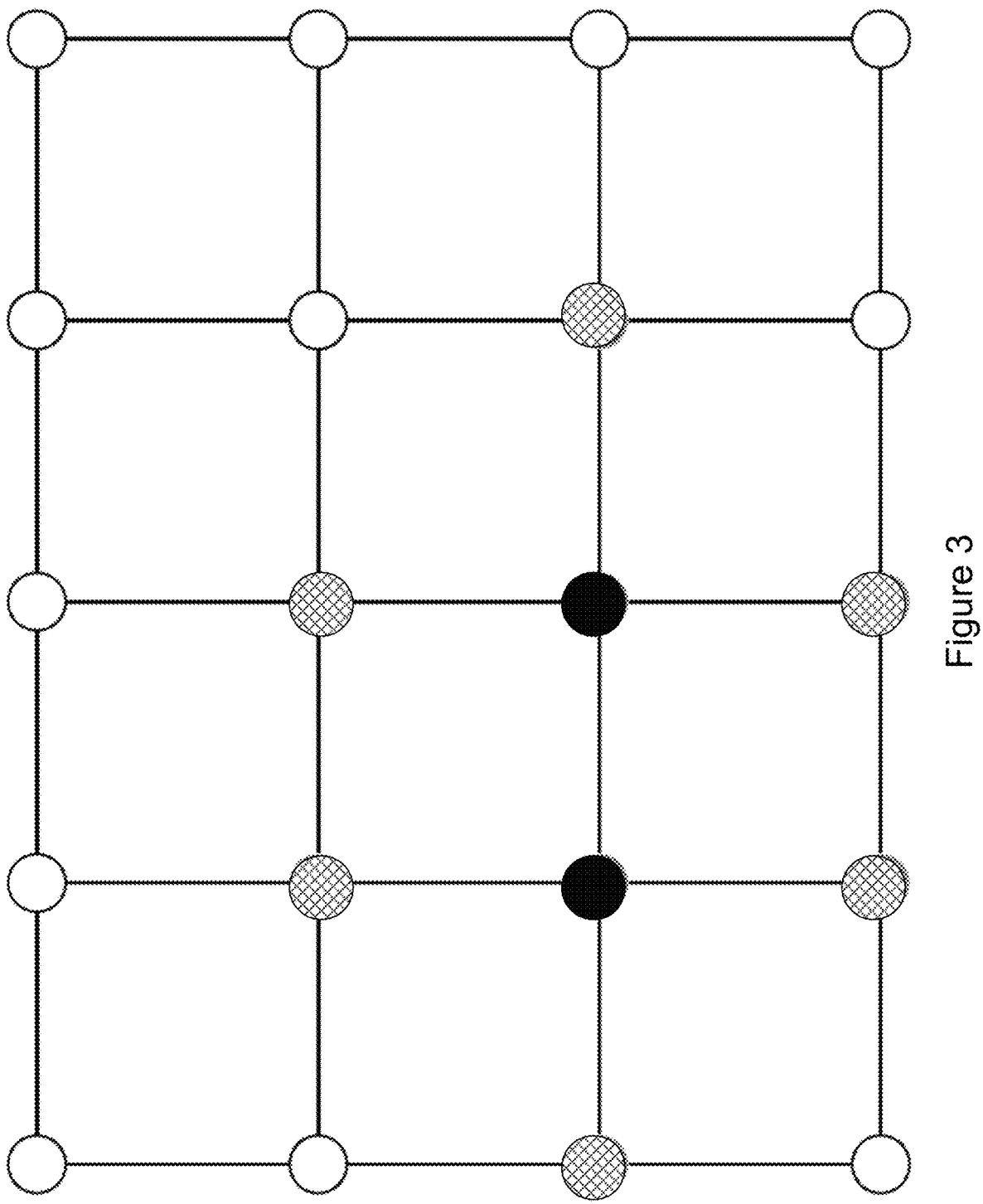
FIG. 3 illustrates a graphical model of a system of twenty qubits on a grid with nearest-neighbor non-local crosstalk, in accordance with an exemplary embodiment of the present disclosure.

Referring to FIG. 3, a graphical model depicting a system of 20 qubits on a grid with nearest-neighbor non-local crosstalk is illustrated. One of thirty-one (there are 31 edges; one for each non-local interaction) noise simulations needed to estimate all marginal weight-2 Pauli error probabilities with the approximation (d, o)=(1, 2) is highlighted. The solid black and hashed nodes denote the target subsystem and the environment.

A pair of positive integers (d, o) specifies the expansion order of the noise approximation; d designates the 'environment' distance and o the maximum component order. The present disclosure considers the set $\mathcal{G}_o$ of all components of all induced sub-graphs of G such that the order of every component is less than or equal to o, and any component with an order less than o has the same edges as in G. Said otherwise, the present disclosure does not look at induced components with order less than o. The idea of the simulation scheme is to calculate the Pauli errors that occur on each component.

The systems and methods of the present disclosure approximate the behavior of a component $C \in \mathcal{G}_o$ by evolving it along with all vertices of distance at most d, generating a map $\tau_{C,d}$. Next, the diagonal of the Pauli-Liouville representation of the channel is determined, which is sometimes also known as the Pauli fidelity vector $f_{C,d}$. A Walsh-Hadamard transformation W relates $f_{c,d}$ to the Pauli probability vector $\tilde{p}_{C,d}$, with $f_{C,d} = W\tilde{p}_{C,d}$. See Flammia et al., 2019. The vector $\tilde{p}_{C,d}$ is the error probability distribution for a Pauli twirled copy of $\tau_{C,d}$. Marginalizing the error distribution over the environment produces an estimate of the local error distribution $\tilde{p}_C$ on the target component. After calculating the marginal distributions for all of the components in $\mathcal{G}_o$, the systems and methods described herein can use the theory of probabilistic graphical models to construct an estimate of the entire Pauli error distribution up to some specified error weight. See Koller et al., 2009, "Probablistictic Graphical Models: Principles and Techniques," MIT Press, print, which is hereby incorporated by reference in its entirety. By truncating the distribution at some error weight, the size of the distribution scales polynomially in the number of qubits.

In some embodiments, including the nearest environmental nodes is sufficient to compute the local error distribution with high relative precision. The systems and methods described herein allow for one to intuitively understand the limited-depth requirement from the fact that intermediate systems must mediate the influence of one subsystem on a nonadjacent subsystem. In some embodiments, these effects are formally bound with Lieb-Robinson bounds. See Lieb et al., 1972, Communications in Mathematical Physics, 28, pg. 251, which is hereby incorporated by reference in its entirety.

Single-qubit gate engineering. The present disclosure provides a review of an embodiment of single-qubit operations on transmons. A local oscillator acts as a single tone microwave source outputting a constant signal $\cos(\omega' t)$ that is shaped by an arbitrary waveform generator via an IQ mixer. A good description of a transmon qubit is an anharmonic oscillator driven by microwave pulses. In the lab frame, the relevant Hamiltonian is $$H = \omega \hat{n} + \frac{\alpha}{2}(\hat{n} - 1)\hat{n} + \Omega(t)\cos(\omega' t + \gamma)(\hat{a} + \hat{a}^\dagger) \tag{28}$$

where $\hat{a}$ is a annihilation operator of an oscillator, $\hat{n} = \hat{a}^\dagger \hat{a}$, $\alpha$ is an anharmonicity, $\gamma$ is a drive phase, $\omega$ is a resonant frequency of the oscillator, $\Omega(t)$ specifies a drive envelope, and setting $\hbar = 1$.

The lowest two energy levels form the qubit subspace. Including the third energy level models the leading-order effect of leakage provided the anharmonicity is sufficiently large. After making a rotating wave approximation (RWA) and moving into the rotating frame of the qubit, the Hamiltonian projected into the qubit subspace is $$H = \frac{1}{2}\Omega(t)e^{-i[\gamma + (\omega' - \omega)t]}|0\rangle\langle 1| + h.c. \tag{29}$$

To see how the control induces single-qubit gates, consider a resonant pulse ($\omega = \omega'$), and $\lambda = 0$, which corresponds to an ideal sufficiently long pulse. The control generates X and Y gates by modulating the coupling between the zero and one states, while the drive phase fixes the rotation axis in the XY-plane, and the pulse area sets the rotation angle. Rotations about the remaining Z-axis correspond to a change in the relative phase between the states. Rather than manipulating the transmon's state, it is equivalent to rotate the control with respect to the state, realizing a virtual-Z gate. See, Knill et al., 2000, "An Algorithmic Benchmark for Quantum Information Processing," Nature, 404(67776), pg. 368; Knill et al., 2008, "Randomized Benchmarking of Quantum Gates," Physical Review A, 77(1), pg. 012307; McKay et al., 2017, "Efficient Z Gates for Quantum Computing," Physical Review A, 96(2), pg. 022330, each of which is hereby incorporated by reference in its entirety. The systems and methods of the present disclosure accomplish this physically by adding a phase offset to all subsequent gates. A pulse with an area $\int dt\Omega(t)=\pi/2$ and a relative phase offset $\gamma$ generates the unitary $V(\gamma)=Z_{-\gamma}X_{\pi/2}Z_{\gamma}$ with the notation $A_\theta=\exp(-i\theta A/2)$. Combining two of these phase-offset $\pi/2$ pulses and a final virtual-Z realizes any element of SU(2). See McKay et al., 2017, "Efficient Z Gates for Quantum Computing," Physical Review A, 96, pg. 022330, which is hereby incorporated by reference in its entirety.

Figure 4:
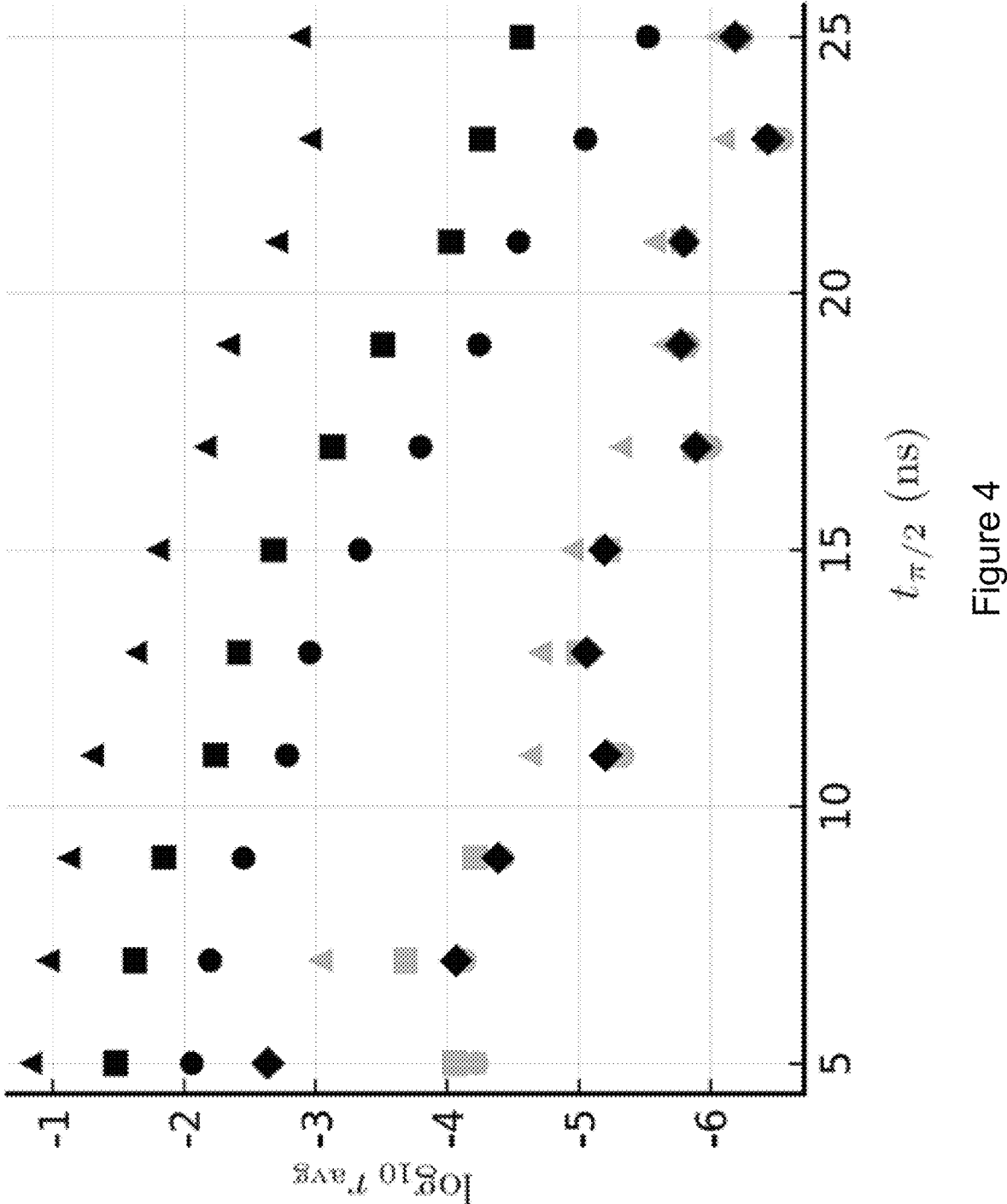
FIG. 4 illustrates a plot of an average single-qubit process inidielity as a function of time, in accordance with an exemplary embodiment of the present disclosure.

Referring to FIG. 4, a plot is provided illustrating a significant improvement in the average single-qubit process infidelity as a function of the time for a $\pi/2$ gate (the total simulation time is $2t_{\pi/2}$). There are 100 qubits in a square 2D array, and each qubit implements a random element of SU(2) via two $\pi/2$ pulses with intermediate phase offsets. The diamonds denote the infidelity of the qubits with half-derivative DRAG corrections and no crosstalk. The black circles, squares and triangles are infidelities obtained under the same control with crosstalk. More specifically, the black circles, squares, and triangles denote several relative crosstalk strengths $\beta_{ij}$, that are sampled from a normal distribution with mean zero and standard deviations $\sigma=0.05$, $\sigma=0.1$, and $\sigma=0.25$ respectively. The grey circles, squares, and triangles have identical crosstalk as their black counterparts, but with optimized control parameters.

Consider the problem of implementing an arbitrary element of SU(2)$^{\otimes n}$ concurrently on an ensemble of qubits where their respective drive fields weakly interact with other qubits. The semiclassical Hamiltonian governing transmon k with local drive crosstalk is $$H_k = \omega_k \hat{n} + \frac{\alpha_k}{2}(\hat{n}-1)\hat{n} + \sum_j \beta_{jk}\Omega_j(t)\cos(\omega'_j t + \phi_j + \theta_{jk})(\hat{a} + \hat{a}^\dagger). \tag{30}$$

The parameters $\beta$ and $\theta$ characterize the crosstalk affecting the system. The present disclosure focuses on the case where each transmon has a local drive. The crosstalk parameters are n×n matrices, and one can set $\beta_{kk}=1$ and $\theta_{kk}=0$ without loss of generality by modifying $\Omega_k$ and $\phi_k$. These constraints lead to interpret $\beta$ as a relative drive strength, and $\theta$ as a phase lag. Experimental data supports the model, and one can efficiently estimate the parameters with standard Rabi and Ramsey experiments. See Xia et al., 2015, "Randomized Benchmarking of Single-Qubit GAtes in a 2D Array of Neutral-Atom Qubits," Physical Review Letters, 114(10), pg. 100503; Magesan et al., 2020, "Effective Hamiltonian Models of the Cross-Resonance Gates," Physical Review A, 101(5), pg. 052308; Xue et al., "Benchmarking Gate Fidelities in a Si/SiGe Two-Qubit Device," Physical Review X, 9(2), 2019, pg. 021011, each of which is hereby incorporated by reference in its entirety.

The systems and methods of the present disclosure simulate a system of n=100 transmons that evolve under (30) and include the first three energy levels. The qubits are on a square grid with $\beta_{jk}$ non-zero only for neighboring qubits.

Qubits have a frequency of either $\omega/2\pi=3$ GHz or $\omega/2\pi=3.1$ GHz, and no two adjacent qubits have the same frequency. All qubits have anharmonicity $\alpha/2\pi=-330$ MHz. In each iteration, the target gate is chosen randomly from SU(2)$^{\otimes n}$. The crosstalk phase lag parameter $\theta_{jk}$ are sampled randomly from the interval [0, $2\pi$), and draw $\beta_{jk}$ from a normal distribution centered at zero. There are two discrete periods of successive evolution, each taking time $t_{\pi/2}$. It is necessary to pick pulse shapes. On the one hand, pulses that yield error rates near the decoherence limit for short gate times are desired. On the other hand, there are experimental realities, such as power-bandwidth constraints and the degree of calibration needed to implement complicated pulses accurately. Balancing these constraints, select Gaussian pulses with std$\Omega^{(x)}=t_{\pi/2}/4$, and half-derivative DRAG corrections $\Omega^{(y)}=-\dot{\Omega}^{(x)}/2\alpha$. See Motzoi et al., 2009, "Simple Pulses for Elimination of Leaking in Weakly Nonlinear Qubits," Physical Review Letters, 103(11), pg. 110501; Gambetta et al., 2011, "Superconducting Qubit with Purcell Protection and Tunable Coupling," Physical Review Letters, 106(3), pg. 030502; Chen et al., 2016, "Measuring and Suppressing Quantum State Leakage in a Superconducting Qubit," Physical Review Letters, 116(2), 020501, each of which is hereby incorporated by reference in its entirety.

FIG. 4 provides an average single-qubit process infidelity $r_{avg}=1-\langle\Phi_k\rangle$ as a function of $t_{\pi/2}$. Diamonds denote the raw infidelity for a crosstalk-free system ($\beta_{jk}=\delta_{jk}$, where $\delta_{jk}$ is the Kronecker delta). The squares are infidelities obtained using the crosstalk-free control scheme but with various strengths of drive crosstalk. The triangles are infidelities obtained with optimized control and the same drive crosstalk as the squares. In some embodiments, the present disclosure optimizes control pulses with the method of Machnes et al., 2018, "Gradient Optimization of Analytic Controls: The Route to High Accuracy Quantum Optimal Control," arXiv preprint, arXiv:1507.04261, print, which is hereby incorporated by reference in its entirety. Applying the protocol requires the selection of appropriate optimization parameters. Sticking to a simple control ansatz, the systems and methods described herein tune the overall magnitude of the resonant $\Omega^{(x)}$ quadrature, off-resonant $\Omega^{(y)}$ quadrature and the carrier signal phase $\phi$, for a total of 7n parameters. Accordingly, approximately two orders of magnitude improvement in the infidelity is observed with the crosstalk minimization systems and methods of the present disclosure.

In some embodiments, such as real experimental devices, decoherence significantly reduces the average error rates. Moreover, decoherence errors grow with time, whereas control errors typically decrease. These contrasting effects imply that there is an optimal gate time that minimizes their combined errors. Thus, the present disclosure repeats the simulation by implementing SU(2)$^{\otimes n}$ with decoherence added to the model. Table I presents data showing the potential benefit of the systems and methods described herein.

TABLE I

Data highlighting a dramatic reduction in the average single-qubit process
infidelity for a simulation with realistic decoherence on a square array of
100 qubits and various levels of crosstalk (std $\beta_{jk}$). We model the same
system considered in FIG. ??, but with $T_1 \sim \mathcal{N}$ (40 µs, 5 µs) for each qubit,
and $T_2 = 3T_1/2$. Naturally, there is an optimal gate time that minimizes the
combined incoherent (increasing) and coherent (approximately decreasing)
effects. We optimize the controls for $t_{\pi/2} = 1, 2, \ldots , 50$ ns. The 'Original'
column corresponds to the optimal $t_{\pi/2}$ without control tuneup. For all values
of std $\beta_{j,k}$, $r_{avg}$ is minimized at $t_{\pi/2} = 2$ ns. On contemporary experimental
devices, $t_{\pi/2} = 2$ ns exceeds accesible bandwidths, so we also report
$r_{avg}$ for $t_{\pi/2} = 5$ ns.

| Crosstalk std $\beta jk$ | Original $r_{avg}$ | Opt., $t_{\pi/2} = 2$ ns $r_{avg}$ | Opt., $t_{\pi/2} = 5$ ns $r_{avg}$ |
|---|---|---|---|
| 0.05 | 6.02e−4 | 1.00e−4 | 1.86e−4 |
| 0.1 | 7.13e−4 | 1.03e−4 | 1.91e−4 |
| 0.25 | 2.13e−3 | 1.15e−4 | 1.84e−4 |
| 0.5 | 1.77e−2 | 1.07e−4 | 1.81e−4 |

Two-qubit gate engineering. Now, consider continuing the simulations using the ideal system of fixed-frequency transmons and the parameter values described supra. A goal is to implement parallel cross-resonance gates, which are equivalent to CNOTs up to single-qubit operations. See Rigetti et al., 2005, "Protocol for Universal Gates in Optimally Biased Superconducting Qubits," Physical Review Letters, 94(24), pg. 240502; Chow et al., 2012, "Simple All-Microwave Entangling Gate for Fixed-Frequency Superconducting Qubits," Physical Review Letters, 107(1), pg. 080502; Sheldon, S., 2016, "Procedure for Systematically Tuning Up Cross-talk in the Cross-Resonance Gate," Physical Review A, 93(6), pg. 060302; Allen et al., 2019, "Minimal Time Robust Two Qubit Gates in Circuit QED," arXiv preprint, arXiv:1902.08056, each of which is hereby incorporated by reference in its entirety. Constant capacitive coupling provides a mechanism for implementing entangling operations. Assuming equal coupling between all neighboring qubits in the system, the corresponding interaction Hamiltonian is $$H_{int} = J \sum_{\langle j,k \rangle = 1} a_j a_k^\dagger + a_j^\dagger a_k, \tag{31}$$

where $\langle j, k \rangle = 1$ denotes a sum over all adjacent qubit pairs. The entire system evolves under $H_{int} + \Sigma_k H_k$.

An aspect of the cross resonance effect is that if the qubits are defined in a dressed basis, local microwave drive fields drive both single and two-qubit gates. For two ideal coupled qubits, in the dressed basis, a drive applied to qubit 1 at the frequency of qubit 2 yields the effective Hamiltonian $$H_d = \Omega(t)\left(X_1 - \frac{J}{\Delta}Z_1 X_2\right), \tag{32}$$

where $\Delta = \omega_1 - \omega_2$ is the difference of qubit frequencies and we made an RWA. Although the systems and methods provided herein can decouple the direct qubit coupling, higher-levels of the transmon lead to additional terms in the effective Hamiltonian. See Magesan et al., 2018. In some embodiments, the $Z_1 X_2$ term is used to generate a maximally entangling gate.

Again, a system of n=100 transmons on a grid is simulated with the first three energy levels of each transmon included. In some embodiments, adjacent qubits are grouped into pairs and tries to implement 50 simultaneous maximally entangling gates using the CR effect. Accordingly, qubits have 5 distinct frequencies (3.0, 3.1, . . . , 3.4 GHz) to ensure each CR pair is addressable. Further, the frequencies are set so that no two neighbors of one qubit have the same frequency. The target CNOT equivalent is determined using Cartan's KAK decomposition and is invariant to local operations. See Tucci, R., "An Introduction to Cartan's KAK Decomposition for QC Programmers," Quantum Physics, arXiv:0507171, which is hereby incorporated by reference in its entirety. The qubit coupling strength is $J/2\pi$=3.8 MHz. The present disclosure realizes qubit control with the same drives as above but with variable drive detuning and phase offset. Moreover, the present disclosure independently parameterizes the resonant $\Omega^{(x)}$ and off-resonant $\Omega^{(y)}$ control envelopes with the first three Hanning window functions $$\Omega_H(t) = \sum_{k=1}^{3} c_k\left[1 - \cos\left(\frac{2\pi k t}{t_{CR}}\right)\right]. \tag{33}$$

There are a total of 8n parameters that determine the n drive fields.

Figure 5:
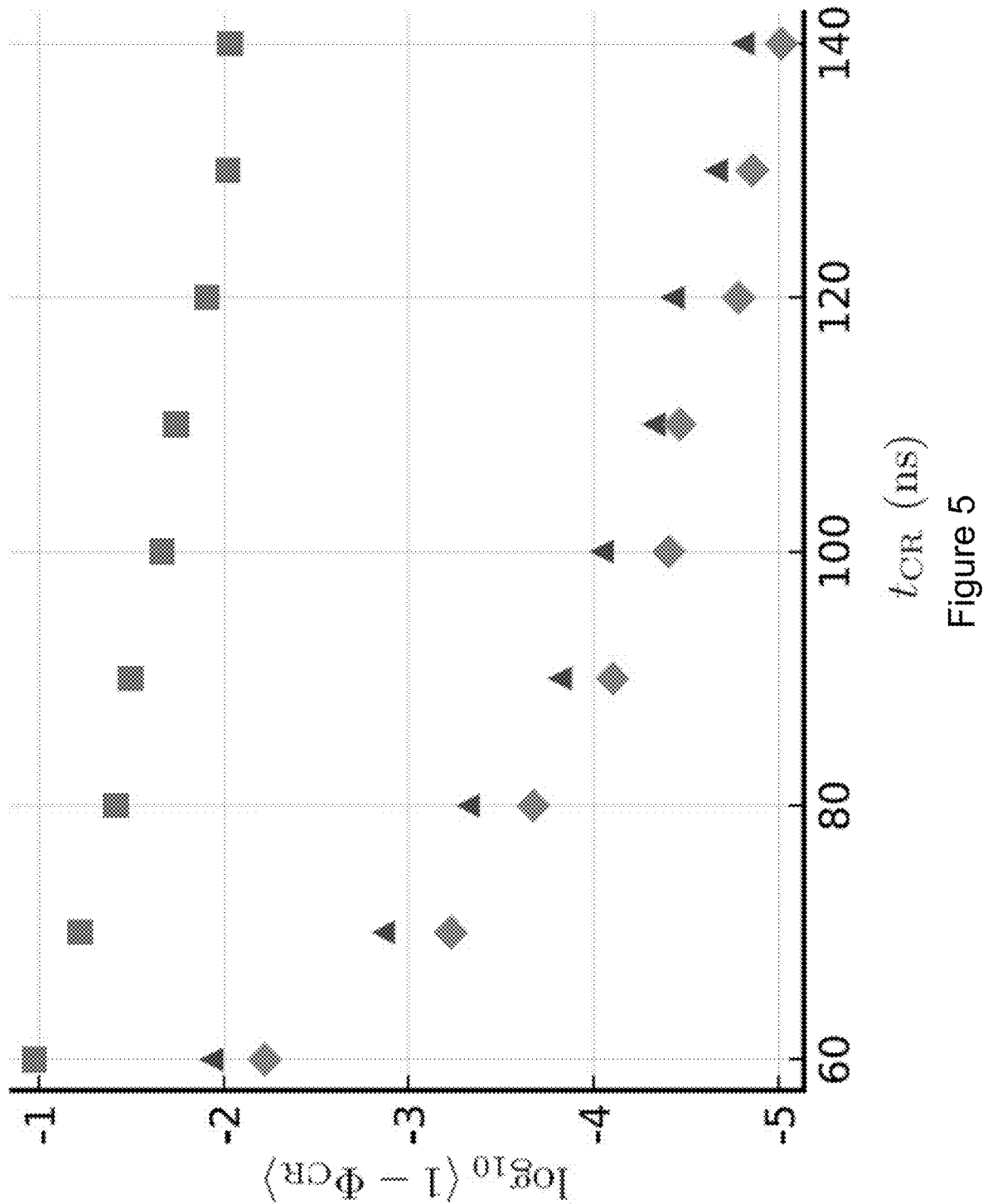
FIG. 5 illustrates an average two-qubit process infidelity for a square array of transmons, in accordance with an exemplary embodiment of the present disclosure.

Referring to FIG. 5, a graphical chart is provided that illustrates the average two-qubit process infidelity of each entangling gate as a function of the gate duration $t_{CR}$ for a square array of transmons implementing 50 simultaneous maximally entangling gates via CR interactions in which each two-qubit pair approximates a CNOT-gate up to local operations. The present disclosure computes all points with optimized pulse parameters but under different system models. See Machnes et al., 2018. Diamonds denote the infidelity obtained using a drive-crosstalk-free model and no undesirable J coupling. The squares are infidelities calculated using the crosstalk-free optimal control but with added drive crosstalk ($\sigma$=0.1) and nonlocal coupling. The triangles are infidelities obtained with controls tuned up under the crosstalk model. The nonlocal crosstalk effects are approximated with d=1. The deviation caused by including additional neighbors is unresolvable on the plot.

Accordingly, the systems and methods of the present disclosure efficiently model and minimize crosstalk that occurs during qubit idling and gates. Compared to other quantum control methods such as dynamical decoupling, which attempts to echo out undesirable interactions, the present disclosure change parameters so the effects do not appear in the first place. See Viola et al., 1999, "Dynamical Decoupling of Open Quantum Systems," Physical Review Letters, 82(12), pg. 2417, which is hereby incorporated by reference in its entirety. Results provided herein show how to mitigate such effects on transmons using a fast control tuneup procedure on a digital computer. As such, the present disclosure aids in understanding the role of crosstalk on NISQ devices and validate improved pulse shapes. Furthermore, the present disclosure can extend our simulation capabilities to other platforms such as trapped ions and apply our methods to improve the performance of experimental platforms.

Figure 6:
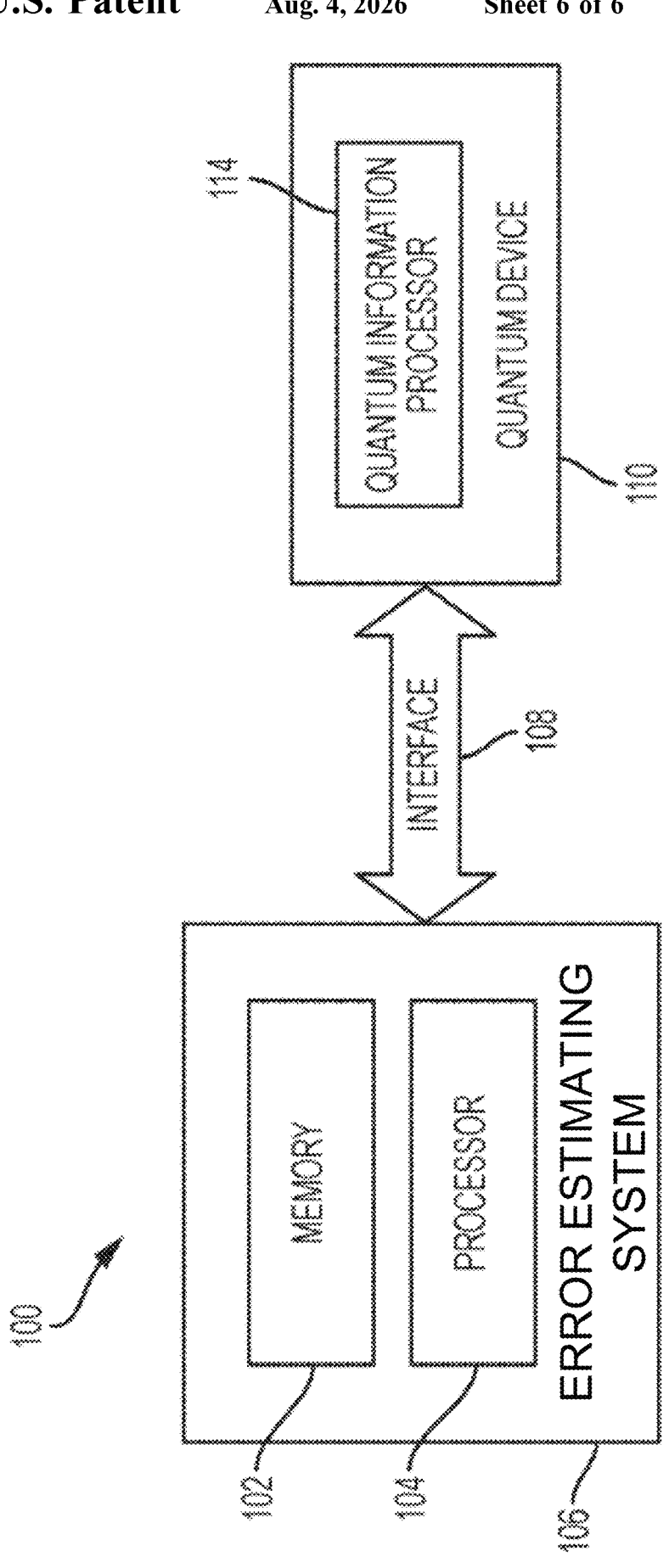
FIG. 6 is a schematic diagram showing aspects of an example system in accordance with an exemplary embodiment of the present disclosure.

FIG. 6 is a schematic diagram showing aspects of an example system 100 that includes an error estimating system (digital computer system) 106, a quantum computer system 110 and an interface 108. The quantum computer system 110 includes a quantum information processor 114. The interface 108 provides communication between the error estimating system 106 and the quantum computer system 110. The system 100 may include additional or different features.

Although not illustrated in FIG. 6, in some embodiments the error estimating system controls a plurality of fields that act upon the qudits of the quantum computer system 110.

The example error estimating system 106 has computational resources (e.g., hardware, software, firmware) that are used to produce executable instructions (e.g., machine code) for the quantum computer system 110. In some implementations, the error estimating system 106 can be implemented as a classical digital computer system, such as, for example, a laptop computer, a desktop computer, a computer workstation, a server, a server cluster, a mainframe, or another type of classical computer system. As shown in FIG. 6, the example error estimating system 106 includes a memory 102 and one or more digital processors 104. The error estimating system 106 may include other components, and may be configured to operate in another manner.

In some instances, the memory 102 of the error estimating system 106 stores quantum-logic source code to be executed by the quantum information processor 114. For instance, the quantum-logic source code may be stored as quantum-logic gate sequences, quantum-logic circuits, quantum algorithms or other representations of quantum-logic. In some instances, the processor 104 of the error estimating system 106 converts the quantum-logic source code into machine code that can be executed by the quantum information processor 114. For instance, the machine code may be stored as a pulse sequence (e.g., radio frequency, microwave frequency, optical frequency), a pulse program, or another type of control sequence configured for execution by the quantum information processor 114. The machine code can be stored on the memory 102 of the error estimating system 106, transferred to the quantum computer system 110 via the interface 108, or handled in another manner.

The example memory 102 can include, for example, random access memory (RAM), a storage device (e.g., a writable read-only memory (ROM) or others), a hard disk, or another type of storage medium. The example memory 102 can store instructions (e.g., computer code, a computer program, etc.) associated with an operating system, computer applications and other resources. The memory 102 can also store application data and data objects that can be interpreted by one or more applications or virtual machines running on the error estimating system 106. In some embodiments, the memory 102 stores computer-readable instructions for software applications, scripts, programs, functions, executables or other modules that are executed by the processor 104. For example, the computer-readable instructions may be configured to perform one or more of the methods described in the present disclosure.

The example processor 104 can execute instructions, for example, to generate output data based on data inputs. For example, the processor 104 can run computer programs by executing the software, scripts, programs, functions, executables, or other modules stored in the memory 102. In some embodiments, the processor 104 may perform one or more of the methods described in the present disclosure. The example processor 104 shown in FIG. 6 can include one or more chips or chipsets that include analog circuitry, digital circuitry or a combination thereof. In some embodiments, the processor 104 includes multiple processor devices such as, for example, one or more main processors and one or more co-processors.

In some aspects of operation, the compiler system 106 obtains quantum-logic source code (e.g., a quantum-logic gate sequence, a quantum-logic circuit, a quantum algorithm, etc.) and provides the quantum-logic source code to the quantum computer system 110 for execution by the quantum information processor 114. In some embodiments, the quantum-logic source code can be modified to reduce the effects of noise in the quantum information processor 114. The error estimating system 106 may compile portions (e.g., one or more clock cycles) of the quantum-logic source code "on-the-fly" while the quantum information processor 114 executes earlier-compiled portions (e.g., earlier clock cycles). For instance, each cycle of the modified quantum-logic source code may be provided to the quantum computer system 110 individually.

The example quantum computer system 110 can be a quantum computer, a quantum sensor, a quantum system, a quantum repeater or another type of device that operates using a quantum information processor. For example, the quantum computer system 110 may be a universal quantum computer that operates in a fault-tolerant regime and can be programmed and reprogrammed to perform computations. As another example, the quantum computer system 110 may be a quantum repeater that performs quantum error correction in an optical network used for quantum key distribution scheme. As another example, the quantum computer system 110 can be a quantum sensor that can measure physical properties of an external system based on quantum interactions or phenomena.

The example quantum information processor 114 comprises any suitable number of qudits (e.g., quantum bits). For example, the quantum information processor 114 can comprise n qudits in a 2n-dimensional space. The quantum information processor 114 can perform quantum computing operations that manipulate the quantum information. For example, the quantum information processor 114 may coherently control the quantum system and preserve the relative phases of the qudits. If the quantum information processor 114 is a universal quantum computer, in some embodiment it can generally create any coherent state in a Hilbert space. In some embodiments the quantum information processor 114 can be configured to measure the state of the quantum system in a suitable basis. For example, the quantum information processor 114 may be configured to measure one or more of the qudits in a computational basis.

The quantum information processor 114 may be subject to noise that can create errors. The noise can include, for example, coherent noise processes, incoherent noise processes, or decoherent noise processes. The noise can comprise local and nonlocal crosstalk. In some embodiments, the quantum information processor 114 can perform a quantum error correction process that effectively counteracts the noise.

The example interface 108 can include all or part of a connector, a data communication network or another type of communication link. For example, the interface 108 can include one or more wired or wireless connections, one or more wired or wireless networks or other communication channels. In some examples, the interface 108 includes a Local Area Network (LAN), a Wide Area Network (WAN), a private network, a Virtual Private Network (VPN), a public network (such as the Internet), a peer-to-peer network, a cellular network, a Wi-Fi network, a Personal Area Network (PAN) or another type of data communication network. In some examples, the interface 108 includes a wired communication interface (e.g., USB, Ethernet, coaxial, optical) that can be connected directly or indirectly between the compiler system 106 and the quantum device 110.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

All references cited herein are incorporated herein by reference in their entirety and for all purposes to the same extent as if each individual publication or patent or patent application was specifically and individually indicated to be incorporated by reference in its entirety for all purposes.

What is claimed:

1. A digital computer system configured to reduce crosstalk during qubits idling and gates in a quantum computer system that comprises a plurality of qudits, wherein each qudit in the plurality of qudits has a dimension of N, and wherein N is a positive integer of 2 or greater, the digital computer system comprising:

one or more digital processors;

a memory; and one or more programs, wherein the one or more programs are stored in the memory and are configured to be executed by the one or more digital processors, wherein the one or more programs when executed by the one or more processor, cause the one or more processors to:

(i) identify a plurality of interacting systems within the plurality of qudits during the respective quantum operation, wherein each respective interacting system in the plurality of interacting systems comprises a corresponding subset of the plurality of qudits;

(ii) identify a corresponding set of components from the plurality of interacting systems;

(iii) for each respective component in the corresponding set of components, evolve the respective component along with the respective components in the corresponding set of components that interact with the respective component in the respective quantum operation, thereby forming a plurality of maps for the respective set of components;

(iv) calculate, for each respective component in the corresponding set of components, a corresponding marginal distribution using the corresponding map for the respective component, thereby computing a plurality of marginal distributions for the corresponding set of components; and (v) construct a respective estimate of all or a portion of an entire Pauli error distribution for the respective quantum operation from the plurality of marginal distributions for the corresponding set of components; and (vi) generate, based on the constructed estimate, a set of tuned physical drive-field control parameters comprising an updated magnitude of a resonant n(x) quadrature, an updated magnitude of an off-resonant D(Y) quadrature, and an updated carrier signal phase, wherein the tuned control parameters are applied to the quantum computer system during execution of the quantum operation to reduce crosstalk and thereby improve infidelity by more than one order of magnitude for a model of superconducting qubits with realistic parameters.

2. The digital computer system of claim 1, wherein the respective quantum operation is a single-qubit gate or an entangling gate.

3. The digital computer system of claim 1, wherein the set of at least one quantum operation is a plurality of gates implemented in a temporal order on the quantum computer system.

4. The digital computer system of claim 3, wherein a gate in the plurality of gates is an element of SU(2) or SU(4).

5. The digital computer system of claim 3, wherein each gate in the plurality of gates is an element of the unitary group.

6. The digital computer system of claim 1, wherein each component in the corresponding set of components is a set of qudits, in the plurality of qudits, that are coupled together in the respective quantum operation.

7. The digital computer system of claim 1, wherein the quantum system further comprises a plurality of drive fields, wherein each respective drive field in the plurality of drive fields is applied to a corresponding qudit in the plurality of qudits, and the one or more programs further include instructions for using each respective estimate of the portion of the entire Pauli error distribution or the entire Pauli error distribution for each respective quantum operation in the set of at least one quantum operation to optimize a plurality of parameters associated with the plurality of drive fields.

8. The digital computer system of claim 7, wherein the plurality of drive fields includes a different drive field for each qudit in the plurality of qudits.

9. The digital computer system of claim 7, wherein the plurality of parameters includes, for each drive field in the plurality of drive fields, an overall magnitude of a resonant quadrature, an off-resonant quadrature, a carrier signal phase, or a quadrature's phase.

10. The digital computer system of claim 7, the method further comprising using the respective estimate of an entire Pauli error distribution for each respective quantum operation to adjust the plurality of drive fields.

11. The digital computer system of claim 1, wherein a general control Hamiltonian corresponding to the set of at least one quantum operation has the form:

$$H(t, \vec{x})$$

wherein $\vec{x}$ represents a plurality of control parameters $\{x_0, \ldots, x_j\}$ for the plurality of drive fields.

12. The digital computer system of claim 1, wherein the plurality of qudits is two or more physical qudits.

13. The digital computer system of claim 1, wherein the plurality of qudits is four or more physical qudits.

14. The digital computer system of claim 1, wherein the identifying the plurality of interacting systems (i) comprises constructing a corresponding graph G comprising a corresponding plurality of nodes and a corresponding plurality of edges, each respective node in the corresponding plurality of nodes represents a corresponding interacting system in the plurality of interacting systems during the respective quantum operation, and each edge in the corresponding plurality of edges denotes crosstalk that couples a first interacting system associated with a first node and a second interacting system associated with a second node in the corresponding graph.

15. The digital computer system of claim 14, wherein the corresponding set of components includes each component, in each node in each subgraph of the corresponding graph, that has an order that is less than or equal to a predetermined maximum component order in the corresponding graph.

16. The digital computer system of claim 14, wherein the respective components in the corresponding set of components that interact with the respective component are within a predetermined environment distance within the quantum computer system to the respective component.

17. The digital computer system of claim 14, wherein each edge in the corresponding plurality of edges denotes nonlocal crosstalk that couples a first interacting system associated with a first node and a second interacting system associated with a second node in the corresponding graph.

18. The digital computer system of claim 14, wherein the predetermined maximum component order in the corresponding graph is a positive integer between 2 and 8.

19. A non-transitory computer readable storage medium storing one or more programs, the one or more programs comprising instructions of a digital computer system, which when executed by a digital computer system with one or more digital processors, cause the digital computer system to cause the system to reduce crosstalk during qubit idling and gates in a quantum computer system, the quantum computer system comprising a plurality of qudits, wherein each qudit in the plurality of qudits has a dimension of N, wherein N is a positive integer of 2 or greater, the method comprising, for each respective quantum operation in a set of at least one quantum operation, instructions for:

(i) identifying a plurality of interacting systems within the plurality of qudits during the respective quantum operation, wherein each respective interacting system in the plurality of interacting systems comprises a corresponding subset of the plurality of qudits;

(ii) identifying a corresponding set of components from the plurality of interacting systems;

(iii) for each respective component in the corresponding set of components, evolving the respective component along with the respective components in the corresponding set of components that interact with the respective component in the respective quantum operation, thereby forming a plurality of maps for the respective set of components;

(iv) calculating, for each respective component in the corresponding set of components, a corresponding marginal distribution using the corresponding map for the respective component, thereby computing a plurality of marginal distributions for the corresponding set of components; and (v) constructing a respective estimate of all or a portion of an entire Pauli error distribution for the respective quantum operation from the plurality of marginal distributions for the corresponding set of components; and (vi) generating, based on the constructed estimate, a set of tuned physical drive-field control parameters comprising an updated magnitude of a resonant $n(x)$ quadrature, an updated magnitude of an off-resonant $D(Y)$ quadrature, and an updated carrier signal phase, wherein the tuned control parameters are applied to the quantum computer system during execution of the quantum operation to reduce crosstalk and thereby improve infidelity by more than one order of magnitude for a model of superconducting qubits with realistic parameters.

* * * * *